Jan. 3, 1967  G. S. STOCKTON ETAL  3,295,219
DEGREE AND ANGLE INDICATOR

Filed March 31, 1964

INVENTORS
KENNETH M. DUNAGAN,
GEORGE S. STOCKTON,
BY
McMorrow, Berman + Davidson
ATTORNEYS.

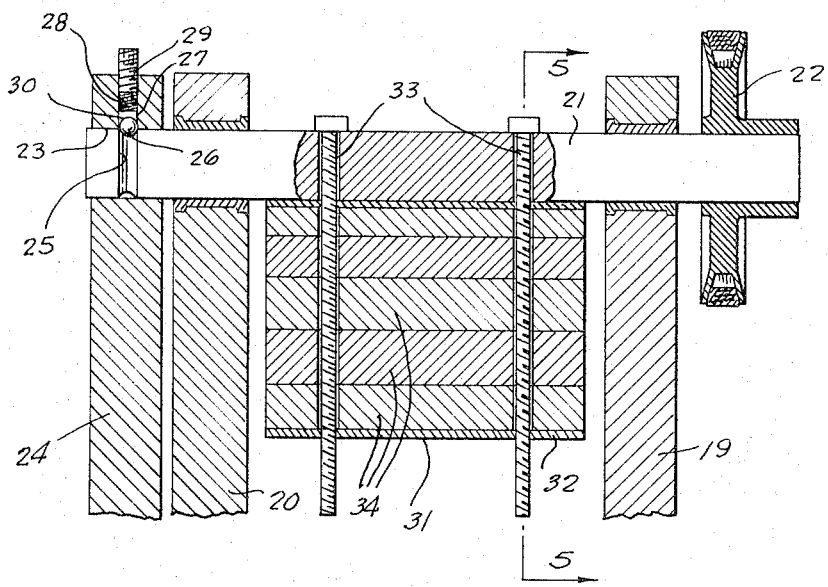
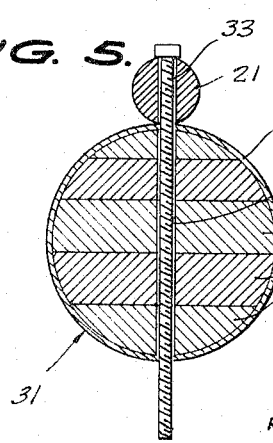
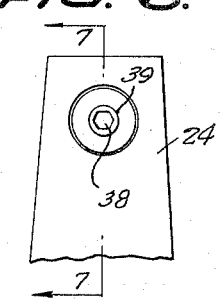
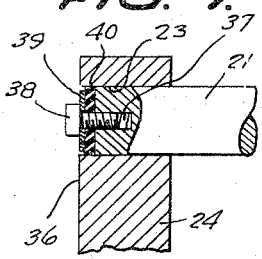
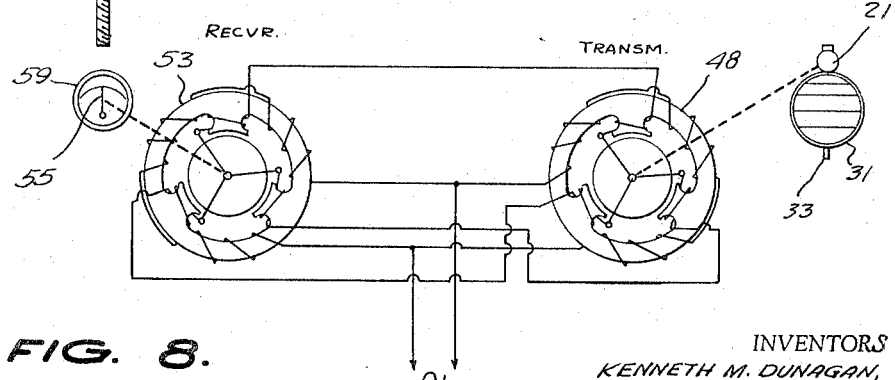

United States Patent Office 3,295,219
Patented Jan. 3, 1967

3,295,219
DEGREE AND ANGLE INDICATOR
George S. Stockton, Artesia, and Kenneth M. Dunagan, Carlsbad, N. Mex., assignors to Universal Equipment Co., Inc., Artesia, N. Mex., a corporation of New Mexico
Filed Mar. 31, 1964, Ser. No. 356,304
1 Claim. (Cl. 33—215)

This invention relates to remote-indicating devices, and more particularly to an apparatus for indicating the angle of inclination of a remotely-located object.

A main object of the invention is to provide a novel and improved remote-indicating device for showing the exact angle of inclination to the horizontal or vertical of a remote object, the apparatus being relatively simple in construction, being easy to install, and providing highly accurate angular indications.

A further object of the invention is to provide an improved remote-indicating angle or degree measuring device intended to provide an accurate indication to an operator at a remote location of the angular position of an object by showing this position as an angle value on an indicating dial by means of an indicating needle, whereby to eliminate the necessity of performing manual calculations or by making angular measurements by means of geometrical or mechanical implements from a remote position, the device involving relatively inexpensive components, being relatively compact in size, and having adjustable sensitivity.

A still further object of the invention is to provide an improved remote-indicating device for measuring angular inclination of an object, the device involving relatively few parts, being durable in construction, and being provided with means for effectively damping the rotation of its pendulum element so as to prevent undesired oscillations thereof.

A still further object of the invention is to provide an improved remote-indicating angle-measuring device for indicating the angle of inclination of an object to a remote operator, the device being provided with means for multiplying the angle of inclination of the object so as to provide a more readable indication on its indicating scale, as well as to provide increased accuracy of measurement of the device.

Further objects and advantages of the invention will become apparent from the following description and claim, and from the accompanying drawings, wherein:

FIGURE 4 is an enlarged fragmentary transverse vertical cross sectional view taken substantially on the line 4—4 of FIGURE 2.

FIGURE 5 is a transverse vertical cross sectional view taken substantially on the line 5—5 of FIGURE 4.

FIGURE 6 is a fragmentary enlarged end elevational view of the top portion of one of the upstanding supports for the pendulum shaft in a modified form of remote-angle indicating apparatus constructed in accordance with the present invention.

FIGURE 7 is a vertical cross sectional view taken substantially on the line 7—7 of FIGURE 6.

FIGURE 8 is a schematic diagram of a typical Selsyn circuit which may be employed in the remote angle-indicating apparatus of FIGURES 1 to 7.

Figure 1:
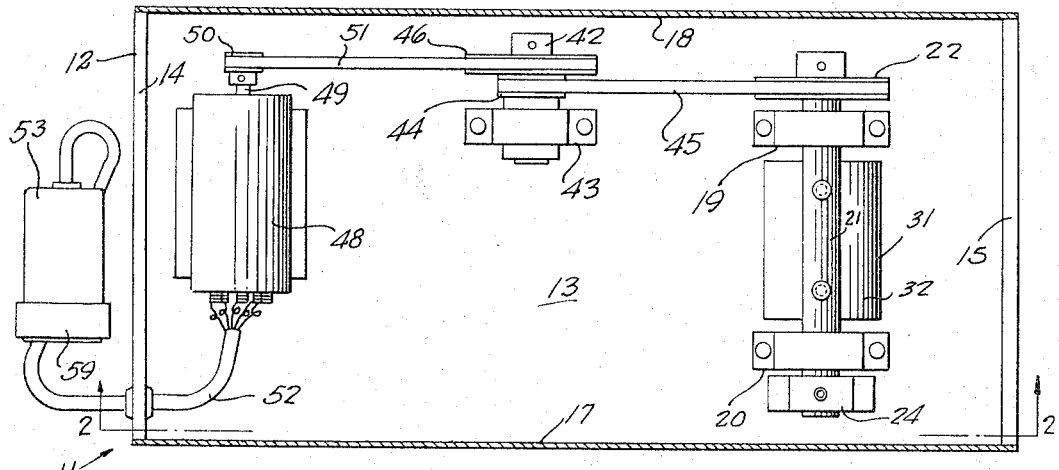
FIGURE 1 is a top plan view of an improved remote-indicating inclination measuring apparatus constructed in accordance with the present invention.
Figure 2:
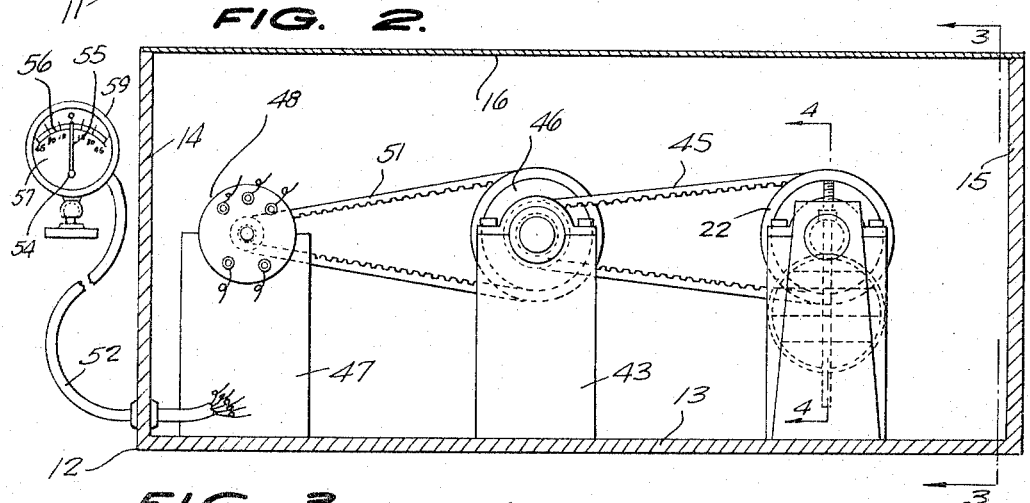
FIGURE 2 is a vertical cross sectional view taken substantially on the line 2—2 of FIGURE 1 and showing the main parts of the angle-measuring device in elevation.
Figure 3:
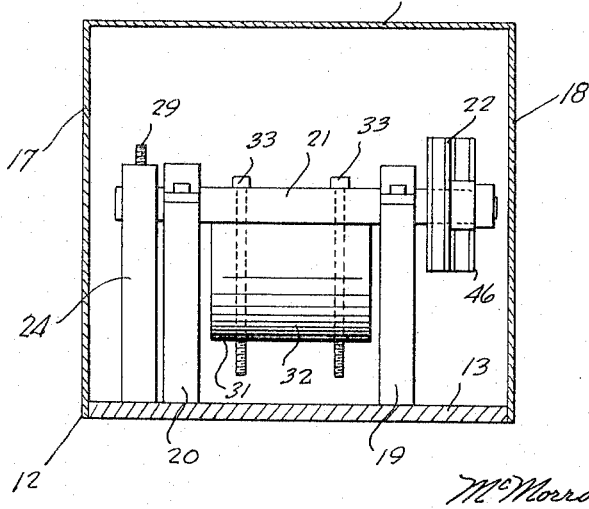
FIGURE 3 is a transverse vertical cross sectional view taken substantially on the line 3—3 of FIGURE 2.

Referring to the drawings, and more particularly to FIGURES 1 to 5 and 8, 11 generally designates a remote angle-indicating apparatus constructed in accordance with the present invention. The apparatus 11 comprises a main housing 12 adapted to be installed or positioned on the object whose inclination is to be indicated, the housing 12 having the bottom wall 13, the front and rear end walls 14 and 15, the top wall 16, and respective longitudinal side walls 17 and 18.

Mounted on the rear portion of bottom wall 13 are a pair of upstanding bearing blocks 19 and 20 on which is journaled the transversely extending pendulum shaft 21, said shaft having secured on one end portion thereof, namely, the end portion adjacent the bearing block 19, a grooved pulley 22. The opposite end portion of the shaft 21 extends rotatably through a bore 23 formed in the top portion of an upstanding post member 24, the shaft being formed with an annular groove 25 of substantially arcuate cross sectional configuration which receives a friction ball 26 contained in the lower portion of a vertical bore 27 provided in the top end of post member 24, the ball being urged downwardly by a biasing coiled spring 28 arranged vertically in the bore 27 and restrained from upward expansion by an adjustable vertical screw 29 threadedly engaged in the top portion of the bore 27, as is clearly shown in FIGURE 4. A spherically recessed shoe member 30 is positioned between spring 28 and the ball 26, receiving the ball in its spherical recess and transmitting the spring force to the ball. By adjusting the screw 29 the amount of frictional force exerted by the ball 26 on the shaft 21 may be regulated, whereby sufficient friction may be provided to prevent oscillations of the shaft.

Designated generally at 31 is a pendulum assembly which is secured to the shaft 21 between the bearing blocks 19 and 20. The pendulum assembly 31 comprises a cylindrical shell 32 through which are threaded a pair of supporting bolts 33, 33, said bolts extending parallel to each other and extending diametrically through the opposite end portions of the shell 32.

As shown in FIGURE 4, the heads of the bolts 33 supportingly engage on the top surface of the shaft 21, the shank portions of the bolts being threaded through the subjacent diametrically opposite portions of the shell 32.

Contained in the shell 32 are a plurality of horizontally arranged lead weight members 34, said weight members being provided with vertical bores 35 receiving the bolts 33, and the longitudinal edges of the weight members being cylindrically curved so as to present conforming arcuate surfaces to the inside surface of the shell member 32. Thus, the weight members 34 slidably fit inside the shell member 32 but are retained therein under normal conditions by the supporting bolts 33 which pass through the vertically aligned bores 35 of the respective weight members 34.

Any desired number of weight members 34 may be employed, in accordance with the desired sensitivity of the apparatus. Thus, by removing the supporting bolts 33, any desired number of weight members 34 may be removed by sliding them longitudinally outwardly, leaving the desired amount of weight members 34 in the shell member 32.

The shell member 32 may also be adjusted in position relative to the shaft member 21, so that the effective radius arm of the pendulum assembly may be altered, if so desired. FIGURE 4 shows the radius arm at minimum length. By rotating the supporting bolts 33 in a direction to lower the shell member 32, the effective radius arm of the pendulum assembly may be increased.

FIGURES 6 and 7 illustrate an alternative means for damping oscillations of the shaft 21. Thus, the shaft 21 may terminate a short distance inwardly of the outer surface 36 of post member 24 and the shaft may be provided with a tapped axial bore 37 receiving the threaded shank of a bolt 38. Interposed between the head of bolt 38 and the end of shift 21 are a rigid compression washer 39 and a friction washer 40 of resilient deformable material, such as rubber, or the like, which may be expanded into frictional contact with the surface of bore 23 by tightening the bolt 38. The force exerted by the head of the bolt through washer 39 on the resilient deformable washer 40 causes the resilient deformable washer to expand laterally and thus frictionally engage bore 23. The amount of frictional force developed by the washer 40 may be regulated by adjusting the bolt 38.

Transversely journaled on the intermediate portion of bottom wall 13 is a shaft 42, said shaft being supported on a bearing block 43. Secured on the shaft is a small pulley 44 which is coupled to the relatively large pulley 22 by a V-belt 45. Secured on shaft 42 is a relatively large grooved pulley 46. Secured on a supporting block 47 at the forward end of the housing 12 is a Selsyn transmitting unit 48 having a shaft 49 provided with a relatively small grooved pulley 50 which is coupled to the relatively large grooved pulley 46 by a V-belt 51. The transmitting Selsyn unit 48 is connected by means of a cable 52 extending through front wall 14 to a remote Selsyn receiver 53 provided with an output shaft 54 on which is mounted an indicating needle 55 which extends adjacent to the angular scale 56 provided on a circular indicating face 57, forming part of an angle-indicating assembly 59 provided at one end of the receiving Selsyn unit 53.

The Selsyn units 48 and 53 may be similar to those disclosed and described in detail in U.S. Patent No. 2,269,602 to W. A. Reichel, issued Jan. 13, 1942.

In operation, when the housing 12 becomes inclined, due to the change in angular position of the object on which it is monted, the pendulum assembly 31 swings by gravity to maintain the supporting bolts 33 vertical. This rotates the shaft 21 relative to the supporting members 19 and 20, causing the rotation to be transmitted by the belts 45 and 51 to the Selsyn transmitting unit 48, which in turn transmits the angular rotation of its shaft 49 through the Selsyn system by means of cable 52 to the receiving unit 53, whose shaft 54 rotates through the same angle as the shaft 49 and thereby causes the needle 55 to provide an angle indication on the scale 56. The sensitivity of the apparatus can be regulated by regulating the number of weight members 34 employed and by adjusting the effective radius arm of the pendulum assembly 31 in the manner above described. The accuracy of the indication is very high because of the multiplication of angular movement provided by the pulley and belt system, comprising the large pulley 22, the small pulley 44 and the belt 45, and the large pulley 46, the small pulley 50 and the belt 51. The angle scale 56 is of course suitably calibrated to provide true angular indications in accordance with the multiplication ratio of the aforesaid belt and pulley system connecting shaft 21 to shaft 49.

The speed of response of the pendulum to changes in inclination can be regulated by adjusting the degree of damping of shaft 21, employing the damping means shown either in FIGURE 4 or in the modification illustrated in FIGURES 6 and 7.

While a specific embodiment of an improved remote level indicator has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A remote level indicator comprising a support, a horizontal shaft journaled on said support, a cylindrical shell located below and parallel to said shaft, a plurality of longitudinally extending movable weight members in said shell superimposed on each other, said weight members having arcuate longitudinal edge portions conforming in curvature to the interior surface of the shell, removable spaced bolt means threadedly engaged with said shell and extending through and having tap head portions supported on said shaft, said bolt means extending through the superimposed weight members, whereby to secure the weight members in the shell and to connect the shell to the shaft, said bolt means being rotatable relative to the shell by rotating said top head portions, whereby to adjust the radial distance of the shell and the weight members therein relative to the shaft, a Selsyn transmitter adjacent said shaft, means drivingly coupling said shaft to said Selsyn transmitter, a Selsyn receiver at a location remote from said support, circuit means connecting said Selsyn transmitter to said Selsyn receiver, a level indicating dial, and a movable level indicating pointer located adjacent said dial and being driven by said Selsyn receiver.

References Cited by the Examiner

UNITED STATES PATENTS

| 2,140,380 | 12/1938 | Gawehn | 340—198 |
| 2,254,485 | 9/1941 | Irwin. | |
| 2,435,709 | 2/1948 | Childs | 340—198 X |
| 2,486,697 | 11/1949 | White | 33—220 |
| 2,572,766 | 10/1951 | Rylsky. | |
| 2,853,325 | 9/1958 | Ward | 308—26 X |
| 3,041,587 | 6/1962 | Rasquin | 340—198 |

FOREIGN PATENTS

| 97,266 | 1922 | Switzerland. |
| 1,230,329 | 1960 | France. |

LEONARD FORMAN, *Primary Examiner.*

L. V. ANDERSON, *Assistant Examiner.*